United States Patent Office 3,674,530
Patented July 4, 1972

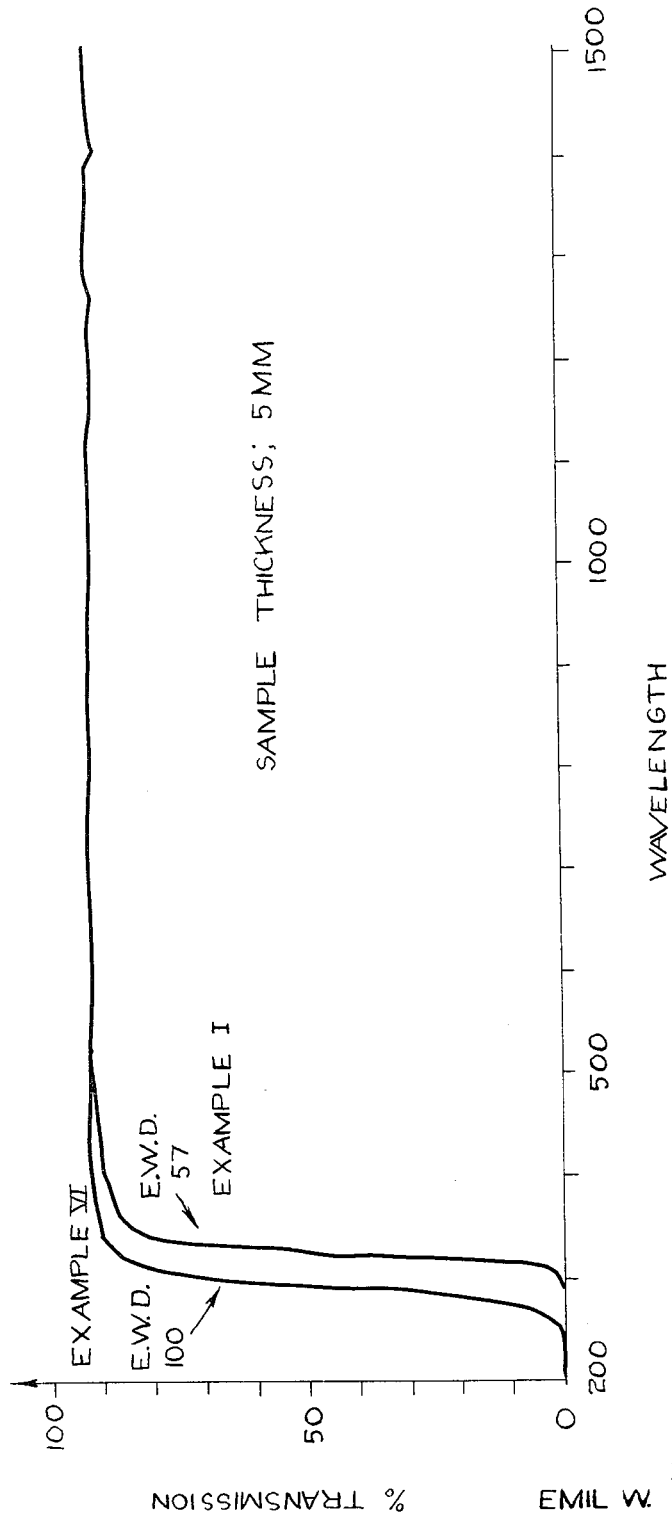

3,674,530
OPTICAL GLASSES HAVING IMPROVED SPECTRAL TRANSMISSION PRODUCED FROM MERCURY NITRATE CONTAINING GLASS BATCHES
Emil W. Deeg, Woodstock, Conn., and Robert E. Graf, Southbridge, Mass., assignors to American Optical Corporation, Southbridge, Mass.
Continuation of abandoned application Ser. No. 848,216, Aug. 7, 1969. This application Mar. 18, 1971, Ser. No. 125,885
Int. Cl. C03c 3/00
U.S. Cl. 106—47 Q    5 Claims

ABSTRACT OF THE DISCLOSURE

The invention relates to a series of new glasses of the low crown and low flint type but with refractive indices lower than those previously obtainable and with improved spectral transmission. The crux of the invention provides for the controlled inclusion of an effective amount of mercury nitrate in glass batch compositions.

CROSS-REFERENCES TO RELATED APPLICATIONS

This application is a continuation of our copending applications, Ser. No. 848,216, filed Aug. 7, 1969, now abandoned.

BACKGROUND

The present invention relates to optical glass and the method of making same. The characteristics of optical glass are extremely critical. High spectral transmission is important as well as in many applications low index of refraction. Such glasses are of importance for use in construction of multi-component, corrected lenses.

OBJECT OF THE INVENTION

It is an object of this invention to provide a new series of optical glasses with Abbe numbers and refractive indices corresponding to low crown and low flint glasses.

BROAD STATEMENT OF THE INVENTION

Optical glass batches, according to this invention, fall within the following ranges by weight:

|  | Percent |
|---|---|
| $SiO_2$ | 45–55 |
| $Pb_3O_4$ | 0–23 |
| $Hg(NO_3)_2 \cdot H_2O$ | 2–32 |
| $Na_2CO_3$ | 3–10 |
| $KNO_3$ | 3–16 |
| Fining agent | About 0.5 |

The fining agent maybe either arsenic trioxide or antimony oxide.

THE DRAWING

The single figure is a graphical representation of the percent light transmission at room temperature of two glasses according to the invention.

DETAILED DESCRIPTION OF THE INVENTION

The glasses of this invention are made according to conventional techniques utilized in making low crown and low flint glasses. Detailed reiteration of such standard practices is deemed unnecessary herein but the interested reader is referred to Kitaigorodski, I. I. "Technologie des Glasses." R. Oldenbourg Verlag Munchen, 1957; pp. 634 to 646 for details.

In the laboratory, compositions according to this invention were prepared in conventional ceramic crucibles using standard glassmaking techniques. The raw materials were optical grade glassmaking sand, and optical grade red lead, sodium and potassium carbonates and nitrates. The mercury nitrate was added as reagent grade mercury nitrate ($Hg(NO_3)_2 \cdot H_2O$). As a fining agent arsenic trioxide was introduced. A specific example for the process used to make such a glass is the following:

A batch consisting of 360.00 grams glassmaking sand, 12.30 grams red lead, 236.00 grams mercury nitrate, 46.20 grams sodium carbonate, 103.20 grams potassium nitrate and 3.00 grams arsenic trioxide was thoroughly mixed. A mullite crucible having a capacity of approximately ½ liter was preheated in an electric furnace up to 1,500° C. The above mentioned batch was transferred to the preheated crucible in portions of approximately 100 grams during a period of about 3.5 hours. After that time, the furnace temperature was increased to 1,550° C. and held at that temperature for another 3.5 hours. During that period, the melt was stirred intermittently with a rotating quartz glass rod for a period of about 2 hours, starting 1 hour after the temperature was increased to 1,550° C. At the end of the melting period, the stirrer was removed from the melt, and the last 0.5 hour of the melting period was used to heat-condition the melt. After that time, the glass was cast into a preheated rectangular graphite mold, having the dimensions 5" x 3" x ¼". The glass sample, together with the mold, was transferred to an annealing furnace and annealed according to standard method and utilizing the information on annealing temperature given in Table II.

In the laboratory six glass compositions were manufactured utilizing the same techniques outlined in the example above and having the percentage compositions of the batch as indicated in Table I below.

TABLE I.—BATCH COMPOSITIONS IN WEIGHT PERCENT

|  | $SiO_2$ | $Pb_3O_4$ | $Hg(NO_3)_2$ | $Na_2CO_3$ | $KNO_3$ | $As_2O_3$ |
|---|---|---|---|---|---|---|
| I | 52.56 | 22.42 | 2.77 | 6.74 | 15.04 | 0.44 |
| II | 51.31 | 17.51 | 9.46 | 6.58 | 14.71 | 0.43 |
| III | 48.98 | 8.36 | 21.93 | 6.28 | 14.04 | 0.41 |
| IV | 48.32 | 5.78 | 25.45 | 6.20 | 13.85 | 0.40 |
| V | 47.26 | 1.62 | 31.11 | 6.07 | 13.55 | 0.39 |
| VI | 46.86 |  | 33.31 | 6.01 | 13.43 | 0.39 |

The glasses prepared from these batches were subjected to rigorous testing and properties were determined as indicated in Table II below.

TABLE II.—GLASS PROPERTIES

| Glass number | D | D In° C. | d. | Strain point, ° C. | Annealing point | Softening point |
|---|---|---|---|---|---|---|
| I | 1.5432 | 48.9 | 2.89 | 398 | 439 | 633 |
| II | 1.5340 | 49.0 | 2.81 | 398 | 439 | 642 |
| III | 1.511 | 56.9 Approximately 85–10⁷. | 2.59 | 393 | 442 | 670 |
| IV | 1.4999 | 55.8 | 2.47 | 428 | 469 | 699 |
| V | 1.4891 | 60.0 | 2.38 | 435 | 481 | 703 |
| VI | 1.4839 | 62.8 | 2.14 | 424 | 479 | 720 |

The spectral transmission of the glasses according to this invention is excellent. The drawing indicates the spectral transmission of the glass compositions labeled Examples I and VI in the tables above.

The precise reasons for the improved spectral transmission afforded by the invention are presently unknown We consider the operable limits of compositions according to this invention to be as follows:

| | Percent |
|---|---|
| $SiO_2$ | 45–55 |
| $Pb_3O_4$ | 0–23 |
| $Hg(NO_3)_2 \cdot H_2O$ | 2–32 |
| $Na_2CO_3$ | 3–10 |
| $KNO_3$ | 3–16 |
| Fining agent | About 0.5 |

Less than 2% $Hg(NO_3)_2 \cdot H_2O$ does not product a significant difference over ordinary low crown or low flint glass. In large melts from batches including over 32% $Hg(NO_3)_2 \cdot H_2O$, crystallization is induced which, of course, degrades the optical quality of the glass. 27% by weight based on the total glass batch composition, however, is the preferred limit.

Having thus described the invention in detail and with sufficient particularity as to enable those skilled in the art to practice it, what is desired to have protected by Letters Patent is set forth in the following claims.

We claim:

1. An optical glass batch composition consisting essentially of the following ingredients given by weight:

| | Percent |
|---|---|
| $SiO_2$ | 45–55 |
| $Pb_3O_4$ | 0–23 |
| $Hg(NO_3)_2 \cdot H_2O$ | 2–32 |
| $Na_2CO_3$ | 3–10 |
| $KNO_3$ | 3–16 |
| Fining agent | About 0.5 | the fining agent being chosen from the group consisting of arsenic trioxide and antimony oxide, the sum of the percentages equalling 100%.

2. The batch composition of claim 1 in which the $Hg(NO_3)_2 \cdot H_2O$ amounts to 2–27% by weight.

3. The batch composition of claim 1 in which said $Na_2CO_3$ amounts to 6.5% by weight and the $KNO_3$ 14.5% by weight.

4. The batch composition of claim 3 in which said $SiO_2$ amounts to 50% by weight and the $Pb_3O_4$ 1.0% by weight.

5. An optical glass batch composition according to claim 1 characterized by producing a glass having a spectral transmission curve substantially falling between the curves of the drawing.

References Cited

UNITED STATES PATENTS 3,499,774   3/1970   Weyl _____ 106—47 R

TOBIAS E. LEVOW, Primary Examiner

W. R. SATTERFIELD, Assistant Examiner

U.S. Cl. X.R.

106—52, 53